(12) United States Patent
Schweizer et al.

(10) Patent No.: US 11,931,753 B2
(45) Date of Patent: Mar. 19, 2024

(54) PRINTHEAD FOR A 3D PRINTER (71) Applicant: Robert Bosch GmbH, Stuttgart (DE)

(72) Inventors: Benjamin Schweizer, Horb (DE); Eberhard Maier, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 967 days.

(21) Appl. No.: 16/766,827

(22) PCT Filed: Oct. 15, 2018

(86) PCT No.: PCT/EP2018/078001
§ 371 (c)(1),
(2) Date: Dec. 14, 2020

(87) PCT Pub. No.: WO2019/101437
PCT Pub. Date: May 31, 2019

(65) Prior Publication Data
US 2021/0121965 A1 Apr. 29, 2021

(30) Foreign Application Priority Data
Nov. 27, 2017 (DE) ................. 10 2017 221 178.4

(51) Int. Cl.
*B22F 12/53* (2021.01)
*B05B 1/32* (2006.01)
(Continued)

(52) U.S. Cl.
CPC ............. *B05B 1/323* (2013.01); *B22F 3/115* (2013.01); *B22F 12/53* (2021.01); *B22F 10/22* (2021.01);
(Continued)

(58) Field of Classification Search
CPC ......... B05B 1/323; B05B 1/083; B22F 12/53; B22F 3/115; B22F 10/22; B22F 10/20;
(Continued)

(56) References Cited

U.S. PATENT DOCUMENTS 5,598,200 A * 1/1997 Gore .................. B22F 9/08
347/88
6,450,416 B1 * 9/2002 Berg .................. B05C 5/0225
239/102.1
(Continued)

FOREIGN PATENT DOCUMENTS

CN 1628225 A 6/2005
CN 204869667 12/2015
(Continued)

OTHER PUBLICATIONS

International Search Report for Application No. PCT/EP2019/078001 dated Jan. 24, 2019 (English Translation, 3 pages).

*Primary Examiner* — Scott R Kastler
*Assistant Examiner* — Michael Aboagye
(74) *Attorney, Agent, or Firm* — Michael Best & Friedrich LLP (57) ABSTRACT

The invention relates to a printhead (1) for a 3D printer, particularly a metal printer, comprising a housing (3), a device (28) for supplying a metal (14), a reservoir (7, 27), a nozzle device (2) and a piston (5), the nozzle device (2) comprising a guide sleeve (11), a nozzle plate (9) provided with an outlet (10), and a clamping device (4). The nozzle plate (9) and the guide sleeve (11) are mutually elastically braced by means of the clamping device (4), and the guide sleeve (11) and the reservoir (7, 27) are mutually elastically braced by means of the clamping device (4).

17 Claims, 4 Drawing Sheets

(51) Int. Cl.
*B22F 3/115* (2006.01)
*B22F 10/22* (2021.01)
*B22F 10/32* (2021.01)
*B22F 12/10* (2021.01)
*B22F 12/90* (2021.01)
*B33Y 30/00* (2015.01)

(52) U.S. Cl.
CPC ............... *B22F 10/32* (2021.01); *B22F 12/10* (2021.01); *B22F 12/90* (2021.01); *B22F 2202/07* (2013.01); *B22F 2203/05* (2013.01); *B33Y 30/00* (2014.12)

(58) Field of Classification Search
CPC ......... B33Y 30/00; B33Y 40/00; B33Y 50/00; B33Y 10/00
USPC ................ 222/596, 590, 591, 593; 266/236; 347/88, 54; 700/118, 119
See application file for complete search history.

(56) References Cited

U.S. PATENT DOCUMENTS

| | | | | |
|---|---|---|---|---|
| 6,773,927 | B2* | 8/2004 | Osawa | .................. B01L 3/0217 |
| | | | | 73/864.11 |
| 8,523,331 | B2* | 9/2013 | Houben | .................. B22F 10/22 |
| | | | | 347/100 |
| 9,307,625 | B2* | 4/2016 | Rollinger | ............... H05G 2/006 |
| 2017/0087632 | A1 | 3/2017 | Mark | |

FOREIGN PATENT DOCUMENTS

| | | |
|---|---|---|
| CN | 205020809 | 2/2016 |
| CN | 105538715 A | 5/2016 |
| CN | 205341921 U | 6/2016 |
| CN | 106064477 | 5/2017 |
| DE | 102014110799 | 2/2016 |
| DE | 102016224047 | 6/2018 |

* cited by examiner

PRINTHEAD FOR A 3D PRINTER

BACKGROUND OF THE INVENTION

The invention relates to a printhead for a 3D printer, particularly a metal printer.

A 3D printer for a thermoplastic material receives a solid phase of said material as a starting material, produces a liquid phase therefrom and applies this liquid phase selectively at the locations associated with the object to be produced. A 3D printer of this kind comprises a printhead in which the starting material is melted. Means for producing a relative movement between the printhead and the work surface on which the object is supposed to be formed are furthermore provided. In this case, it is possible for either only the printhead, only the work surface or, alternatively, both the printhead and the work surface to be moved.

The printhead has a first operating state, in which liquid material emerges from it, and a second operating state, in which no liquid material emerges from it. The second operating state is adopted, for example, if a different position is to be approached on the work surface and no material is supposed to be deposited on the way to said position. It is possible to switch between the two operating states of the printhead, for example, by switching the feed of the solid starting material on and off.

As compared with thermoplastics, metals have a significantly higher melting point and, at the same time, have a significantly lower viscosity in the liquid state.

Document DE102016224047, which had not yet been published at the time of this application, shows a printhead for a 3D printer, in particular a metal printer, comprising a housing, a device for supplying a metal, a piston, a reservoir with an outlet opening and an actuator device for moving the piston.

It is distinguished by the fact that the reservoir has a melting region and a displacement space for a liquid phase of the metal, wherein the melting region adjoins an inert atmosphere and is connected to the displacement space in such a way that the liquid phase of the metal can be induced to pass through the outlet opening by the movement of the piston.

The outlet opening is furthermore designed to discharge droplets of the liquid phase of the metal, wherein the outlet opening has the form of a nozzle and can be connected in a fixed manner to the melting crucible, or has an interchangeable insert that allows the use of different nozzle geometries.

No further details are given of the fastening of the insert or the connection to the printhead.

SUMMARY OF THE INVENTION

It is the underlying object of the invention to provide a printhead for a 3D printer having a nozzle device which involves a reliable process and is interchangeable, wherein the connection of the nozzle device to the printhead should withstand even temperatures of >1000° C.

The printhead according to the invention for a 3D printer, particularly a metal printer, comprises a housing, a device for supplying a metal, a reservoir, a nozzle device and a piston, wherein the nozzle device has a guide sleeve, a nozzle plate having an outlet opening, and a clamping device, wherein the nozzle plate and the guide sleeve are clamped together elastically by means of the clamping device, and the guide sleeve and the reservoir are clamped together elastically by means of the clamping device.

The nozzle device advantageously has a plurality of components, such as the guide sleeve, the nozzle plate and the clamping device, whereby the different functions of the nozzle device involve separate components, and advantageous production of the nozzle device and/or of the individual components of the nozzle device can be maintained. The individual components can furthermore be exchanged, depending on the use of the 3D printer.

It is advantageous, for example, to exchange the guide sleeve if a modified piston geometry of the piston is employed. It is advantageously possible, if there is a requirement for different nozzle geometries or different geometries of the outlet opening to exchange the nozzle plate in a simple manner. Depending on the required elastic preloading of the components relative to one another, it is advantageous to adapt or, as appropriate, exchange the clamping device.

The guide sleeve receives the nozzle plate, wherein these are clamped together elastically by means of the clamping device, and the guide sleeve is furthermore arranged in the reservoir and is clamped elastically to the reservoir by means of the clamping device.

It is thereby possible to ensure that tolerances of the components are compensated in an advantageous manner. In addition, shims can be arranged between the components. The elastic clamping of the components by means of the clamping device compensates for differential expansion of the components in an advantageous manner, thereby ensuring, on the one hand, that the components are connected to one another in such a way as to give a reliable process and, on the other hand, that there is an optimized sealing effect at the contact surfaces. This is necessary because liquid metal generally has a very low viscosity and no gaps through which the metal can flow or be forced may arise at the sealing points.

In a development of the invention, the clamping device is formed from a nozzle clamping nut and a separate spring element for the elastic clamping of the guide sleeve to the reservoir.

By virtue of the separate elastic spring element, it is advantageously possible to match the components in respect of the tolerances and the necessary axial preloading to one another.

In another embodiment, the nozzle clamping nut is furthermore formed from a fastening means for fastening the nozzle clamping nut on the guide sleeve and from at least one elastic segment for the axial elastic clamping of the guide sleeve to the nozzle plate.

By means of the fastening means, the nozzle nut can be mounted in an advantageous manner on the guide sleeve, and the axial elastic preloading can be achieved in an advantageous manner by means of the at least one elastic segment of the nozzle clamping nut.

In a development, the guide sleeve and the reservoir are clamped together elastically by means of the fastening means of the nozzle clamping nut and the separate spring element.

In another embodiment, the spring element furthermore has a spring pot for bearing against the reservoir and a spring plate for bearing against the nozzle clamping nut, wherein the spring plate is arranged in an inner offset of the spring pot, and the spring pot is arranged with its side arranged opposite the spring plate against the reservoir.

The spring element embodied separately from the nozzle clamping nut fixes the guide sleeve axially with respect to the reservoir or with respect to the melting crucible in an advantageous manner and additionally seals off the guide sleeve from the reservoir. The spring element is formed from a spring pot and a spring plate, wherein the spring plate is arranged in an inner offset of the spring pot. The axial clamping of the guide sleeve to the reservoir by means of the spring element and the nozzle clamping nut advantageously ensures that the guide sleeve is not taken along in a return stroke of the piston. In addition, the spring element also compensates for a differential axial thermal expansion between the melting crucible and the guide sleeve. Moreover, a tolerance compensation of the components is also made possible by the elasticity of the spring element.

In a development, the nozzle plate and the guide sleeve are clamped together elastically by means of the fastening means and of the at least one elastic segment of the nozzle clamping nut.

The at least one elastic segment of the nozzle clamping nut is embodied as a radial bending bar, for example. The at least one elastic segment ensures the axial elastic clamping of the nozzle plate with respect to the guide sleeve, wherein the tolerances between the nozzle plate and the guide sleeve, on the one hand, and the nozzle clamping nut, on the other hand, are advantageously compensated. In addition, it may be advantageous to insert an axial shim, e.g. between the nozzle plate and the guide sleeve. By virtue of the axial elastic preloading which is produced by the elastic segment, axial sealing of the nozzle plate with respect to the guide sleeve furthermore advantageously takes place.

In a preferred embodiment, the fastening means of the nozzle clamping nut forms a bayonet joint with the guide sleeve, wherein the fastening means of the nozzle clamping nut is formed from at least one projection projecting toward the center line of the nozzle clamping nut, and the guide sleeve has a groove, preferably arranged on the outer circumference, for receiving the projection of the nozzle clamping nut, and at least one recess for passing through the at least one projection of the nozzle clamping nut. The fastening means clamps both the separate spring element and the at least one elastic segment between the nozzle clamping nut and the guide sleeve. Since a thread on the ceramic guide sleeve is not ideal, the bayonet fastener is to be preferred since it is advantageously easy to produce as a ceramic component.

In a development, the guide sleeve is designed to receive the piston, wherein said piston is guided in the axial direction in the guide sleeve and forms a displacement space for a liquid phase of the metal between a pressure side of the piston, an inner surface of the guide sleeve, and the nozzle plate.

In a preferred development, the components forming the displacement space are formed from a ceramic material, and the clamping device is formed from a metallic material. The components forming the displacement space are the piston, particularly the pressure side of the piston, which is formed by the plunger of the piston, the inner side of the guide sleeve, and the nozzle plate.

Owing to the temperature of up to about 1000° C., the clamping device should be temperature-stable. Since it is difficult to obtain identical expansion coefficients of the components at the points where the components are connected, there must be provision for compensation. This compensation is advantageously achieved by the axial elastic preloading, which is possible by virtue of the metallic material of the clamping device. Ceramics have very limited elasticity and in many cases have significant differences in respect of the expansion coefficients thereof. Metals, which can withstand sufficient stresses, even at a relatively high temperature of up to about 1000°, are therefore advantageous.

BRIEF DESCRIPTION OF THE DRAWINGS

Further advantageous embodiments of the invention can be found in the description of the drawings, in which illustrative embodiments of the invention that are illustrated in the figures are described in greater detail.

In the drawings.

DETAILED DESCRIPTION

Figure 1:
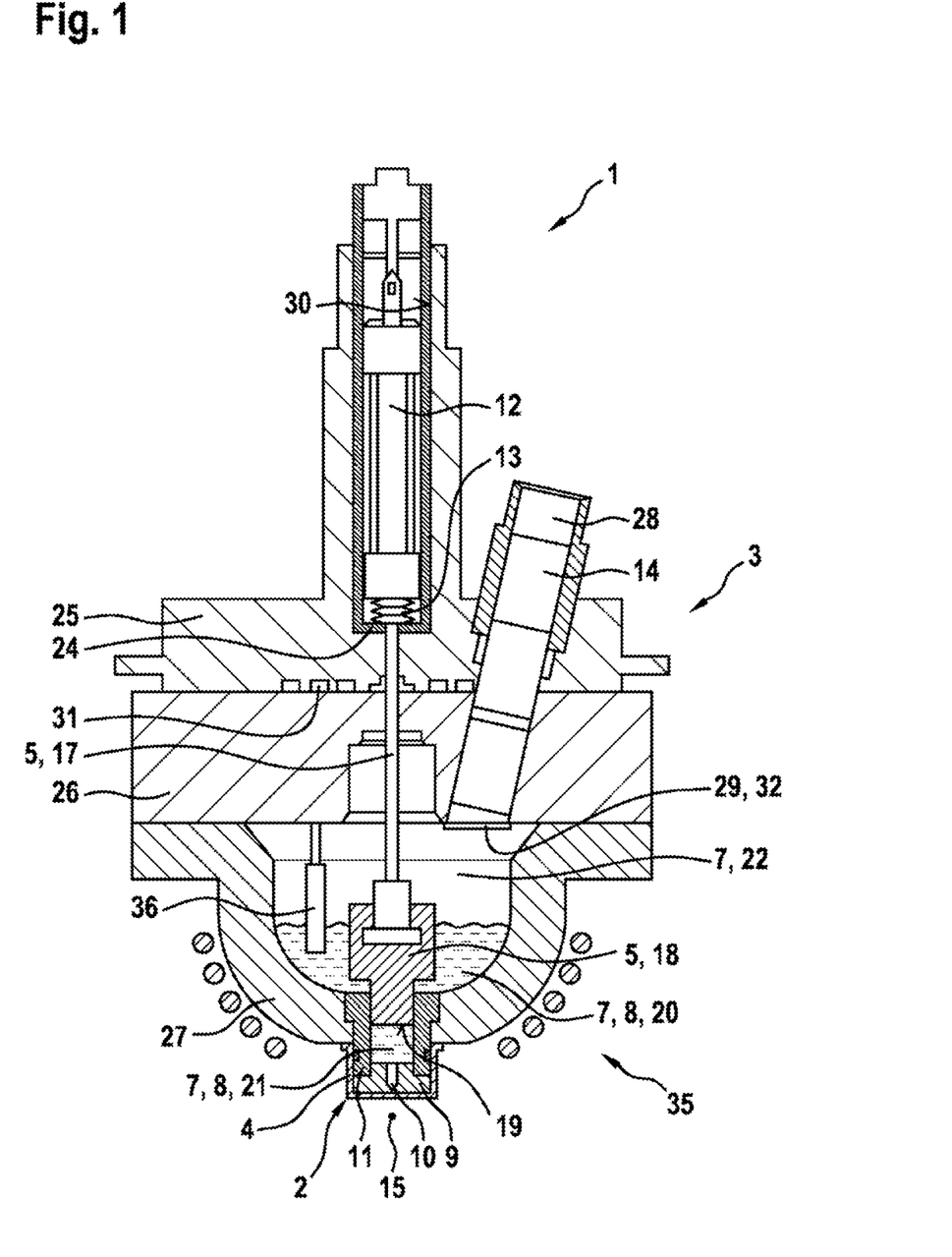
FIG. 1 shows a section through a printhead according to the invention.

FIG. 1 shows an illustrative embodiment of the printhead 1 according to the invention for a 3D printer.

The printhead 1 comprises a housing 3, a device 28 for supplying a metal 14 in the solid phase, a reservoir 7, 27, a nozzle device 2 having an outlet opening 10 and a piston 5. The printhead furthermore comprises an actuator device 12 for moving the piston 5. The reservoir 7, 27 has a melting region 20 and a displacement space 21 for a liquid phase 8 of the metal 14, wherein the melting region 20 adjoins an inert atmosphere 22 and is connected to the displacement space 21 in such a way that the liquid phase 8 of the metal 14 can be induced to pass through the outlet opening 10 by the movement of the piston 5. The liquid phase 8 of the metal 14 or liquid metal 8 is also referred to as the melt 8, and the inert atmosphere 22 is formed by introducing an inert gas 22 into the reservoir 7, 27. The introduction of the inert gas 22 into the reservoir 7, 27 preferably takes place via a cold region of the printhead 1.

The reservoir 7, 27 is designed as a melting crucible 27, wherein an inductor 35 is arranged outside the melting crucible 27, and a sensor 36, in particular a temperature sensor, is arranged within the melting crucible. There may optionally also be an insulator (not illustrated) between the melting crucible 27 and the inductor 35 or inductor coil 35.

The boundary of the inert gas 22 with the liquid metal 8 corresponds to the filling level of the liquid metal 8 in the reservoir 7, 27.

The housing 3 is furthermore of multi-part design, wherein it comprises at least one cooling flange 25, an insulating plate 26 and the reservoir 7, 27.

Temperature-sensitive components of the measuring device can thus advantageously be shielded.

The piston 5 is of multi-part design, wherein it comprises at least one piston rod 17 composed of a metallic material and a plunger 18 composed of a ceramic. Starting from the actuator device 12, the piston rod 17 projects through the cooling flange 25 and the insulating plate 26 and into the reservoir 7, 27, where it merges into the plunger 18.

The cooling flange 25 has a recess 30 for receiving the actuator device 12, which is designed as a piezoelectric actuator 12. During operation, the piezoelectric actuator 12 is fixed in the recess 30 in such a way that, when a voltage is applied, it exerts a working stroke on the piston 5, more specifically on the piston rod 17 of the piston 5. The piston rod 17 transmits the working stroke to the plunger 18, with the result that said plunger induces the liquid phase 8 of the metal 14 to pass through the outlet opening 10. Without actuation by the actuator 12, the piston 5 can be reset to an initial position by a spring 13, wherein the spring 13 is arranged in the recess 30 of the cooling flange 25, between an offset 24 and the actuator 12. The spring 13 is designed as a Belleville spring.

The cooling flange 25 furthermore has cooling channels 31 for cooling. The cooling channels 31 are arranged between the cooling flange 25 and the insulating plate 26 and a cooling medium flows through them. This serves for cooling to counteract the heating by the melt 8 and to cool the actuator 12 in operation. The cooling flange 25 is formed from a metallic material.

The insulating plate 26, which rests against the cooling flange 25 on the same side as the cooling channel 31 is formed from a thermally insulating material and is designed in such a way that it avoids heat transfer from the reservoir 7, 27 to the cooling flange 25.

The device 28 for supplying the metal 14 or replenishing unit 28 opens into the reservoir 7, 27 and is arranged in the cooling flange 25 and in the insulating plate 26. The replenishing unit 28 projects through the cooling flange 25 and the insulating plate 26, and the metal 14 or material 14 to be printed can be supplied from the outside by the device 28. Pre-dosed pieces of material or pellets can preferably be used. At the transition from the insulating plate 26 to the reservoir 7, 27 there is an opening 29, through which the material 14 enters the reservoir 7, 27. The opening 29 can be closed by a device 32, with the result that said opening is preferably open only while the material 14 is being supplied, thereby reducing the escape of energy or gas from the inert atmosphere 22.

The metal 14 passes in a solid phase 14 into the melting region 20 of the melting crucible and is heated by the inductor 35 until it changes to a liquid phase 8. When a desired process temperature of the melt 8 is reached, which is determined by the temperature sensor 36, the printhead 1 can begin operation. The liquid phase 8 or melt 8 passes by the plunger 18 and enters the displacement space 21 owing to the pressure due to the weight of the melt 8 or through a combination of pressure due to weight and the atmospheric pressure of the inert gas 22. The pressure side 19 of the plunger 18 of the piston 5 is surrounded in the melt 8 or by melt 8, and the side on which it is connected to the piston rod 17 is surrounded in the inert atmosphere 22 or by the inert atmosphere 22. By virtue of the process involved, the piston rod 17 does not come into contact with the melt 8.

The ceramic of the plunger 18 advantageously has very high thermal conductivity to enable the heat produced by the inductor 35 to be transferred efficiently into the displacement space 21.

When the piezoelectric actuator 12 is actuated, the pressure side 19 of the plunger 18 exerts a pressure on the melt 8 in the displacement space 21 in the direction of the outlet opening 10 and ensures that a droplet 15 is discharged through the nozzle device 2 or outlet opening 10 of the nozzle device 2. The nozzle device 2 is designed to discharge droplets 15 of the liquid phase 8 of the metal 14, wherein the nozzle device 2 has a guide sleeve 11, a nozzle plate 9 with the outlet opening 10 and a clamping device 4, wherein the nozzle plate 9 and the guide sleeve 11 are clamped together elastically by means of the clamping device 4, and the guide sleeve 11 and the reservoir 7, 27 are clamped together elastically by means of the clamping device 4. The nozzle device 2, in particular the nozzle plate 9, is interchangeable, thereby allowing the use of different nozzle geometries.

Figure 2:
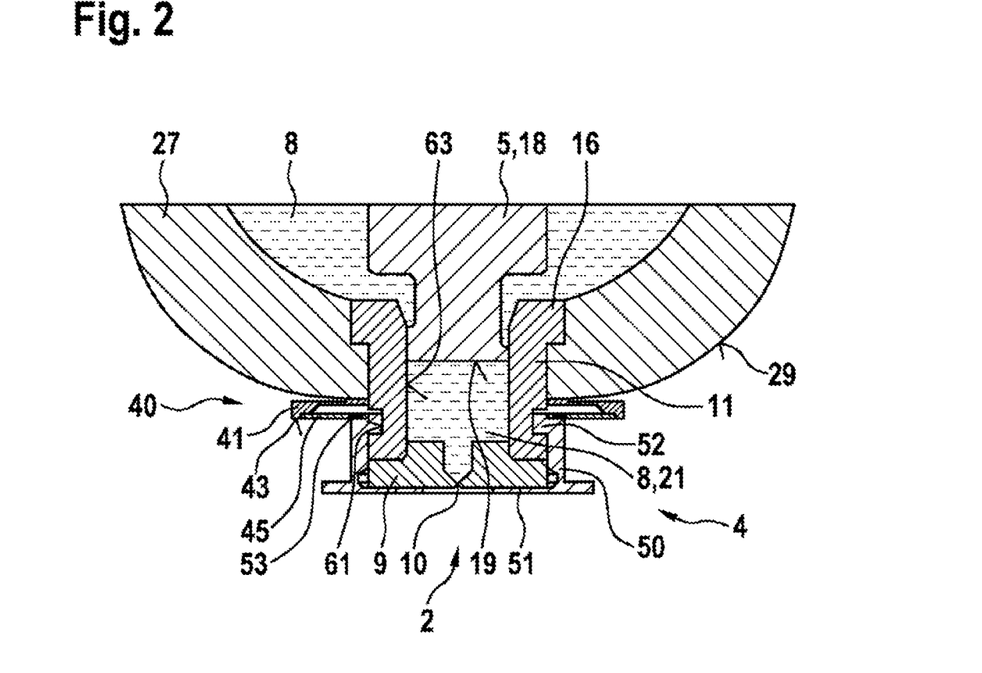
FIG. 2 shows a detailed illustration of an illustrative embodiment of a nozzle device of the printhead.

FIG. 2 shows a detailed illustration of the nozzle device 2 of the printhead 1. It illustrates the nozzle device 2 having the guide sleeve 11, the nozzle plate 9 with the outlet opening 10 and the clamping device 4. The clamping device 4 is formed from a nozzle clamping nut 50 and a separate spring element 40, wherein the clamping device 4, in particular the separate spring element 40 and the nozzle clamping nut 50, is/are formed from a metallic material.

The guide sleeve 11 is designed to receive the piston 5, wherein said piston, more specifically the plunger 18 of the piston 5, is guided in the axial direction in the guide sleeve 11 and forms the displacement space 21 for the liquid phase 8 of the metal 14 between a pressure side 19 of the piston 5, an inner surface 63 of the guide sleeve 11, and the nozzle plate 9.

The components forming the displacement space 21, in particular the piston 5 or the plunger 18 of the piston 5, the guide sleeve 11 and the nozzle plate 9, are formed from a ceramic material.

The guide sleeve 11 and the reservoir 7, 27 are clamped together elastically by means of a fastening means 52 of the nozzle clamping nut 50 and the spring element 40.

The guide sleeve 11 receives the piston 5 or the plunger 18 of the piston 5 and guides it in the axial direction of the printhead 1. The guide sleeve 11 is furthermore supported by means of an offset 16 within the reservoir 27 or the melting crucible. The guide sleeve 11 is composed of a heat-resistant ceramic material since it is in contact at its inner surface 63 with the liquid phase 8 of the metal 14. With the fastening means 52 of the nozzle clamping nut 50, a groove 61 arranged on the outer circumference of the guide sleeve 11 forms a bayonet fastener of the clamping device 4, and the guide sleeve 11 is clamped elastically on an outer side 29 of the reservoir 27 by the clamping device 4.

The nozzle clamping nut 50 is formed from the fastening means 52 for fastening the nozzle clamping nut 50 on the guide sleeve 11 and from at least one elastic segment 51. The nozzle clamping nut 50 is furthermore formed from a material resistant to high temperatures, in particular from a metallic material.

The nozzle plate 9 and the guide sleeve 11 are clamped together elastically by means of the fastening means 52 and of the at least one elastic segment 51 of the nozzle clamping nut 50.

With the groove 61 of the guide sleeve 11, the fastening means 52 forms the bayonet fastener of the nozzle device 2. Closing the bayonet fastener of the nozzle device 2 clamps both the separate spring element 40 between the reservoir 27 and a contact surface 53 of the nozzle clamping nut 50 and the at least one elastic segment 51 of the nozzle clamping nut 50 on the nozzle plate 9. Since a thread on the ceramic guide sleeve is not ideal, the bayonet fastener is to be preferred since it is easy to produce as a ceramic component.

Figure 5:
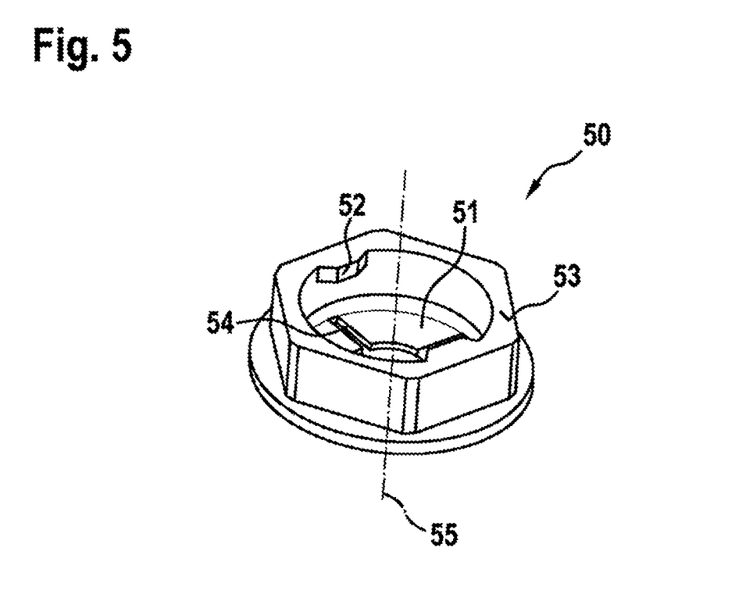
FIG. 5 shows a detail drawing of a nozzle clamping nut of the nozzle device.
Figure 6:
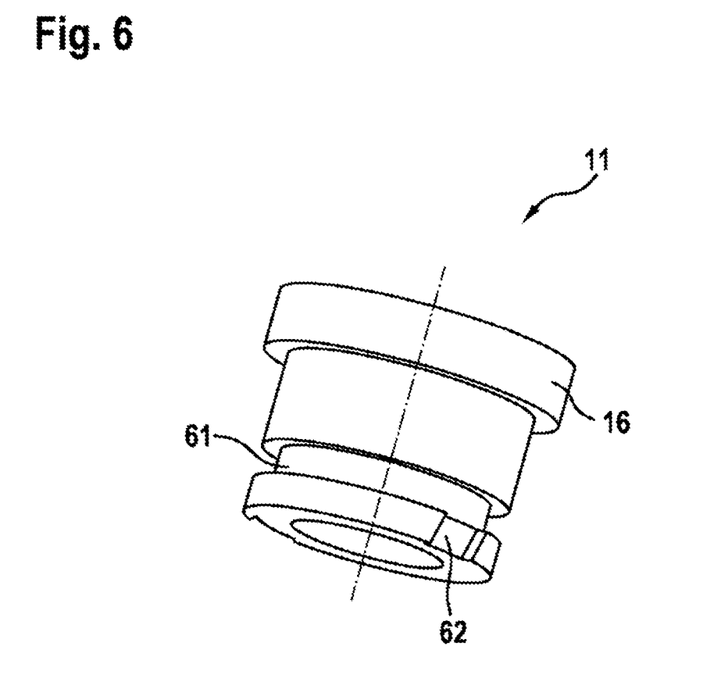
FIG. 6 shows a detail drawing of a guide sleeve of the nozzle device.

The fastening means 52 of the nozzle clamping nut 50 is formed from at least one projection 52 projecting toward the center line 55, illustrated in FIG. 5, of the nozzle clamping nut 50, and the guide sleeve 11 has the groove 61, arranged on the outer circumference, for receiving the projection 52 of the nozzle clamping nut 50, and at least one recess 62, illustrated in FIG. 6, for passing through the at least one projection 52 of the nozzle clamping nut 50. To fasten the nozzle device 2, the nozzle clamping nut 50 is pushed onto the guide sleeve 11, wherein the projection 52 of the nozzle clamping nut 50 is guided through the recess 62 of the guide sleeve 11 and is then received in the groove 61 of the guide sleeve 11. Rotation of the nozzle clamping nut 50 brings the projection 52 into engagement in the groove 62, whereby the nozzle clamping nut 50 is moved in the direction of the reservoir 27. By virtue of this movement, the nozzle plate 9 between the nozzle clamping nut 50 and the guide sleeve 11 is on the one hand preloaded elastically in the axial direction against the guide sleeve 11 by the elastic segment 51 and, on the other hand, the contact surface 53 of the nozzle clamping nut 50 presses in the direction of the reservoir 27 against the spring element 40, as a result of which said spring element is pressed against the reservoir 27, and the guide sleeve 11 and the reservoir 27 are thereby clamped elastically together axially. The guide sleeve 11 engages by means of its offset 16 into the reservoir 27 and is pulled against the reservoir 27 in the opposite direction to the movement of the nozzle clamping nut 50 by tightening the nozzle clamping nut 50.

Figure 3:
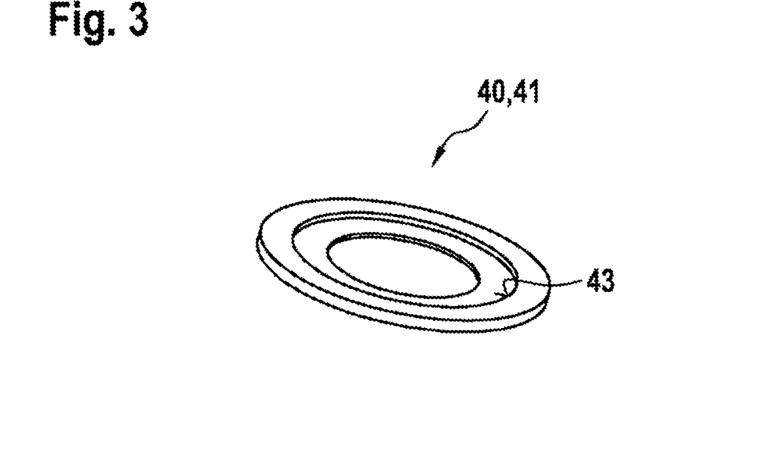
FIG. 3 shows a detail drawing of a spring pot of a spring element of the nozzle device.
Figure 4:
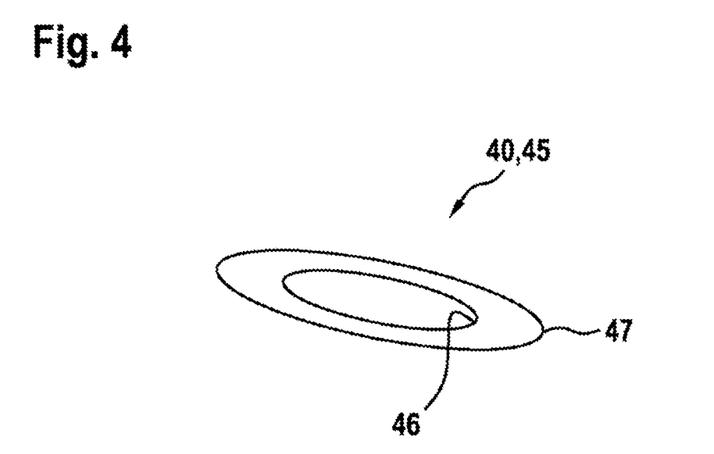
FIG. 4 shows a detail drawing of a spring plate of the spring element of the nozzle device.

The spring element 40 embodied separately from the nozzle clamping nut 50 fixes the guide sleeve 11 axially with respect to the reservoir 27 or with respect to the melting crucible and additionally seals off the guide sleeve 11 from the reservoir 27. The spring element 40 is formed from a spring pot 41 and a spring plate 45, wherein the spring plate 45 is arranged in an inner offset 43, illustrated in FIG. 3, of the spring pot 41. The spring pot 41 serves for bearing against the reservoir 27, and the spring plate 45 serves for bearing against the nozzle clamping nut 50. The contact surface 53 of the nozzle clamping nut 50 rests against an inner region 46, illustrated in FIG. 4, of the spring plate 45 and, when the bayonet fastener is closed, presses in the axial direction of the reservoir 27. An outer region 47, illustrated in FIG. 4, of the spring plate 45 is thereby pressed into the inner offset 43 of the spring pot 41, and the spring plate 45 is deformed elastically or distorted and presses the spring pot 41 against the outer side 29 of the reservoir 27.

The axial clamping of the guide sleeve 11 to the reservoir 27 by means of the spring element 40 and the nozzle clamping nut 50 ensures that the guide sleeve 11 is not taken along in a return stroke of the piston 5. In addition, the spring element 40 can also be used to compensate for a differential axial thermal expansion between the reservoir 27 or melting crucible and the guide sleeve 11. Moreover, a tolerance compensation of the components is also made possible by the elasticity of the spring element 40. In the case of larger tolerances, it is additionally possible to work with axial shims (not illustrated).

In this embodiment, the at least one elastic segment 51 of the nozzle clamping nut 50 is formed from four elastic segments 51, wherein these are separated from one another by slots 54 illustrated in FIG. 6 and have the ability to bend axially toward the center or center line 55 of the nozzle clamping nut 50. They are embodied as radial bending bars. The elastic segments 51 ensure the axial elastic clamping of the nozzle plate 9 with respect to the guide sleeve 11.

Here too, it is important to compensate the tolerances between the ceramics of the nozzle plate 9 and of the guide sleeve 11, on the one hand, and the metallic nozzle clamping nut 50, on the other. In addition, an axial shim (not illustrated) can be inserted between the nozzle plate 9 and the elastic segments 51 of the nozzle clamping nut 50, for example. This arrangement prevents the shim coming into contact with melt 8.

The invention claimed is:

1. A printhead (1) for a 3D metal printer comprising a housing (3), a device (28) for supplying a metal (14), a reservoir (7, 27), a nozzle device (2) and a piston (5), characterized in that the nozzle device (2) has a guide sleeve (11), a nozzle plate (9) having an outlet opening (10), and a clamping device (4), wherein the clamping device (4) includes a nozzle clamping nut (50) and a separate spring element (40), and the nozzle clamping nut (50) includes a fastening means (52) for fastening the nozzle clamping nut (50) on the guide sleeve (11) and at least one elastic segment (51), the nozzle plate (9) and the guide sleeve (11) are clamped together elastically by the clamping device (4), and the guide sleeve (11) and the reservoir (7, 27) are clamped together elastically by the clamping device (4).

2. The printhead (1) as claimed in claim 1, characterized in that the guide sleeve (11) and the reservoir (7, 27) are clamped together elastically by the fastening means (52) of the nozzle clamping nut (50) and the spring element (40).

3. The printhead (1) as claimed in claim 1, characterized in that the spring element (40) has a spring pot (41) for bearing against the reservoir (7, 27) and a spring plate (45) for bearing against the nozzle clamping nut (50).

4. The printhead (1) as claimed in claim 3, characterized in that the spring plate (45) is arranged in an inner offset (43) of the spring pot (41), and the spring pot (41) is arranged with a side arranged opposite the spring plate (45) against the reservoir (7, 27).

5. The printhead (1) as claimed in claim 1, characterized in that the nozzle plate (9) and the guide sleeve (11) are clamped together elastically by the fastening means (52) and by the at least one elastic segment (51) of the nozzle clamping nut (50).

6. The printhead (1) as claimed in claim 1, characterized in that the fastening means (52) of the nozzle clamping nut (50) forms a bayonet joint with the guide sleeve (11), wherein the fastening means (52) of the nozzle clamping nut (50) is formed from at least one projection (52) projecting toward a center line (55) of the nozzle clamping nut (50), and the guide sleeve (11) has a groove (61) for receiving the projection (52) of the nozzle clamping nut (50), and at least one recess (62) for passing through the at least one projection (52) of the nozzle clamping nut (50).

7. The printhead (1) as claimed in claim 1, characterized in that the guide sleeve (11) is configured to receive the piston (5), wherein said piston is guided in the axial direction in the guide sleeve (11) and forms a displacement space (21) for a liquid phase (8) of the metal (14) between a pressure side (19) of the piston (5), an inner surface (63) of the guide sleeve (11), and the nozzle plate (9).

8. The printhead (1) as claimed in claim 7, characterized in that the piston (5), the guide sleeve (11), and the nozzle plate (9) are formed from a ceramic material.

9. The printhead (1) as claimed in claim 1, characterized in that the clamping device (4, 40, 50) is formed from a metallic material.

10. The printhead (1) as claimed in claim 1, characterized in that the guide sleeve (11) and the reservoir (7, 27) are clamped together elastically by the fastening means (52) of the nozzle clamping nut (50) and the spring element (40).

11. The printhead (1) as claimed in claim 10, characterized in that the spring element (40) has a spring pot (41) for bearing against the reservoir (7, 27) and a spring plate (45) for bearing against the nozzle clamping nut (50).

12. The printhead (1) as claimed in claim 11, characterized in that the spring plate (45) is arranged in an inner offset (43) of the spring pot (41), and the spring pot (41) is arranged with a side arranged opposite the spring plate (45) against the reservoir (7, 27).

13. The printhead (1) as claimed in claim 12, characterized in that the nozzle plate (9) and the guide sleeve (11) are clamped together elastically by the fastening means (52) and by the at least one elastic segment (51) of the nozzle clamping nut (50).

14. The printhead (1) as claimed in claim 13, characterized in that the fastening means (52) of the nozzle clamping nut (50) forms a bayonet joint with the guide sleeve (11), wherein the fastening means (52) of the nozzle clamping nut (50) is formed from at least one projection (52) projecting toward a center line (55) of the nozzle clamping nut (50), and the guide sleeve (11) has a groove (61) arranged on an outer circumference for receiving the projection (52) of the nozzle clamping nut (50), and at least one recess (62) for passing through the at least one projection (52) of the nozzle clamping nut (50).

15. The printhead (1) as claimed in claim 14, characterized in that the guide sleeve (11) is configured to receive the piston (5), wherein said piston is guided in the axial direction in the guide sleeve (11) and forms a displacement space (21) for a liquid phase (8) of the metal (14) between a pressure side (19) of the piston (5), an inner surface (63) of the guide sleeve (11), and the nozzle plate (9).

16. The printhead (1) as claimed in claim 15, characterized in that the piston (5), the guide sleeve (11), and the nozzle plate (9) are formed from a ceramic material.

17. The printhead (1) as claimed in claim 16, characterized in that the clamping device (4, 40, 50) is formed from a metallic material.

\* \* \* \* \*